Nov. 20, 1962 H. A. DEWENTER 3,064,949
MIXER
Filed Feb. 27, 1957 4 Sheets-Sheet 1
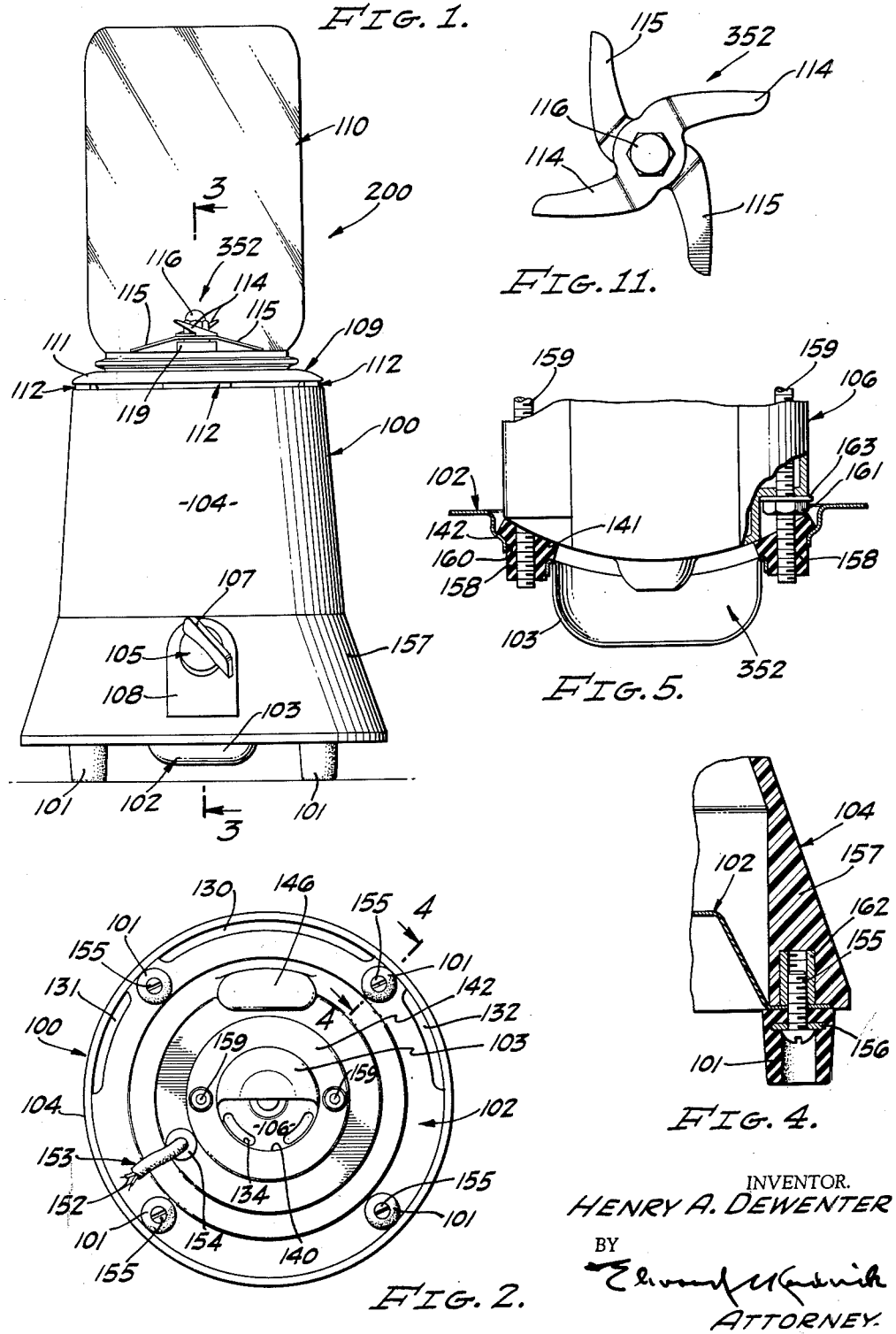
INVENTOR.
HENRY A. DEWENTER
BY
ATTORNEY.

INVENTOR.
HENRY A. DEWENTER
BY
ATTORNEY.

Nov. 20, 1962 H. A. DEWENTER 3,064,949
MIXER

Filed Feb. 27, 1957 4 Sheets-Sheet 3

INVENTOR.
HENRY A. DEWENTER
BY
Edward Kendrick
ATTORNEY.

Nov. 20, 1962 H. A. DEWENTER 3,064,949
MIXER
Filed Feb. 27, 1957 4 Sheets-Sheet 4
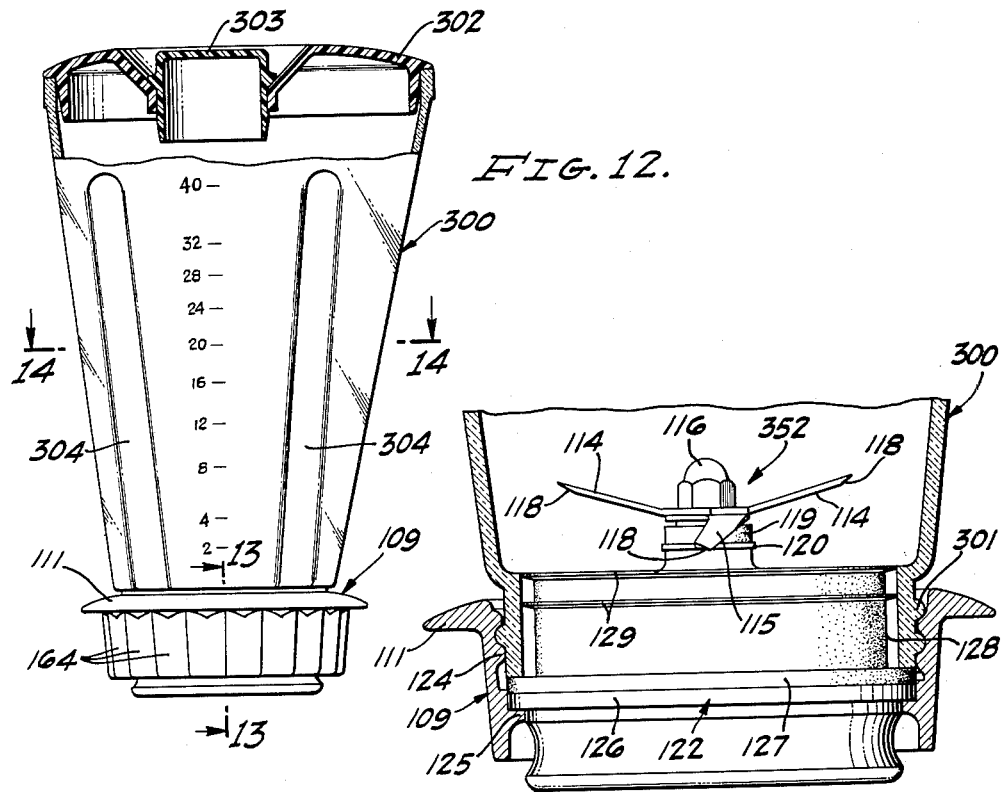
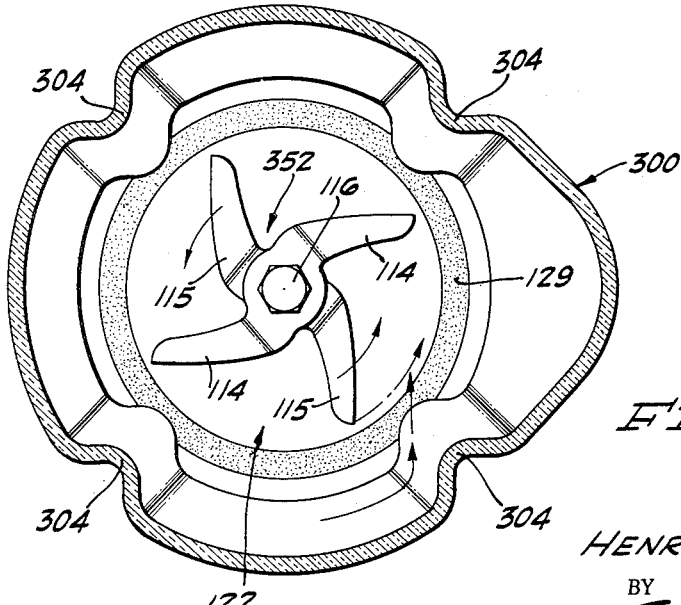
INVENTOR.
HENRY A. DEWENTER
BY
ATTORNEY.

United States Patent Office 3,064,949
Patented Nov. 20, 1962

3,064,949
MIXER
Henry A. Dewenter, 1477 Old Mill Road,
San Marino, Calif.
Filed Feb. 27, 1957, Ser. No. 642,812
30 Claims. (Cl. 259—108)

This invention relates to devices for blending and/or comminuting materials, and more particularly to a device having a material receptacle with a mixing and/or comminuting bladed member fixed to a shaft extending through and adapted to be motor driven from a position below the bottom of the receptacle.

It is therefore an object of the invention to provide a blender of an economical construction.

It is another object of the invention to provide an arrangement for cooling a blender motor with a high degree of efficiency.

It is still another object of the invention to provide a motor driven blender having very little motor vibration.

A further object of the invention is to provide a blender base assembly having means to prevent material to be mixed from entering a motor supported internally of it.

Yet another object of the invention is to provide means to align a material receptacle accurately on an insert to rest on a base assembly of a blender.

Another object of the invention is to provide a blender to comminute materials efficiently and to an unusually small size.

A further object of the invention is to provide a motor drive connection between a blade drive shaft of a blender and a drive shaft of a motor to operate the blender, the connection being easily and safely disconnectible while the motor is running.

A still further object of the invention is to provide a mechanically strong shock absorbing motor drive connection between a blade drive shaft and a motor drive shaft of a blender and a method of making the drive connection.

A still further object of the invention is to provide a blender which is convenient to operate.

These and other objects and advantages of the present invention will be better understood when considered with the following description taken in connection with the accompanying drawings made a part of this specification wherein several embodiments are illustrated by way of example. The device of the present invention is by no means limited to the specific embodiments illustrated in the drawings since they are shown merely for purposes of description.

FIG. 1 is a front elevational view of the mixer of the invention;

FIG. 2 is a bottom view of the mixer shown in FIG. 1;

FIG. 4 is an enlarged broken away sectional view of a base portion of the mixer taken on the line 4—4 shown in FIG. 2;

FIG. 5 is an enlarged broken away sectional view of a motor mounting taken on the line 5—5 shown in FIG. 3;

FIG. 11 is a plan view of bladed members used in mixing and comminution in the mixer of the invention;

FIG. 12 is a broken away sectional view in elevation of a container assembly incorporating a material receptacle of an alternate but preferred construction;

FIG. 13 is an enlarged broken away sectional view of the receptacle taken on the line 13—13 shown in FIG. 12; and FIG. 14 is a transverse sectional view of the receptacle taken on the line 14—14 shown in FIG. 12.

Figure 3:
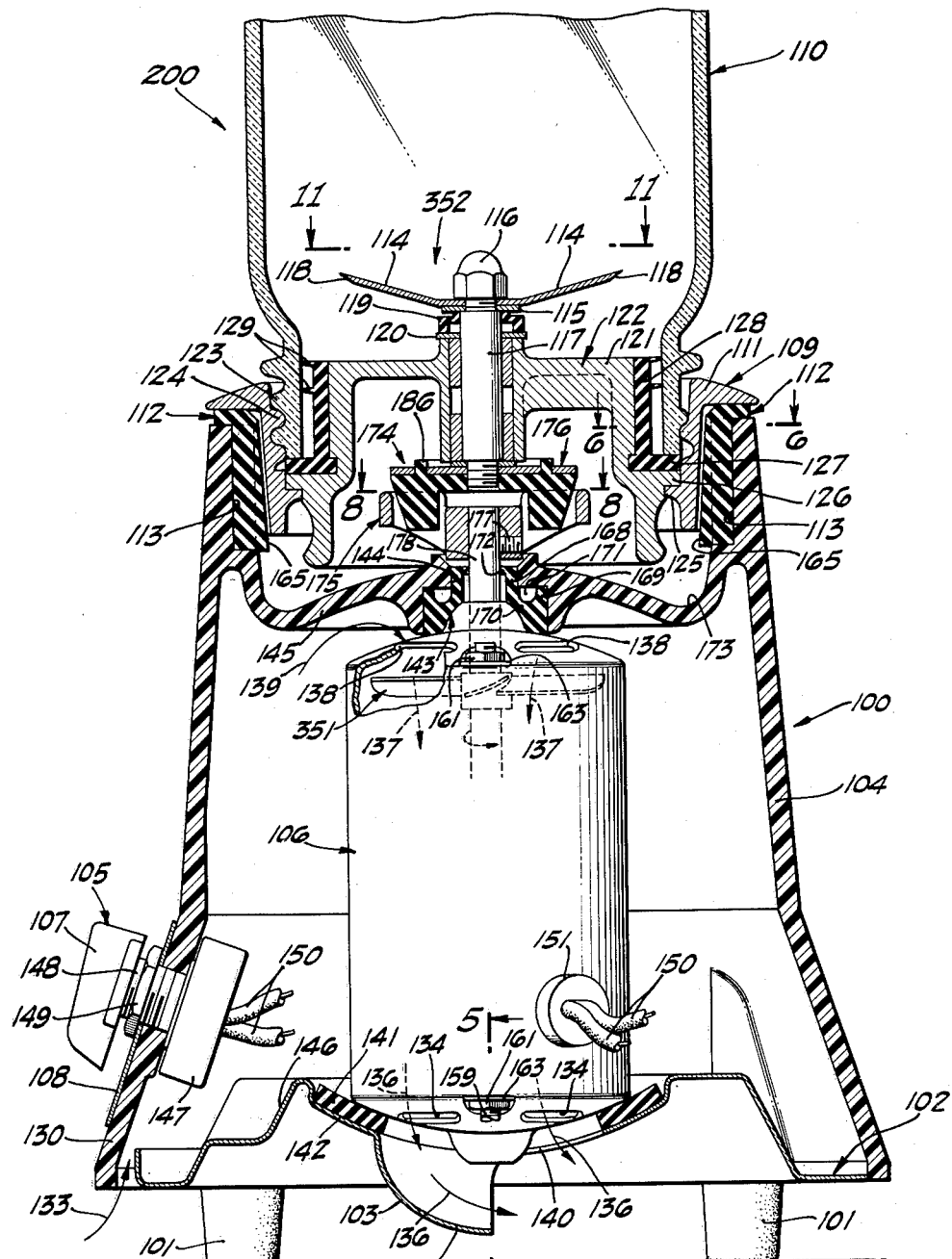
FIG. 3 is a vertical sectional view of the mixer taken on the line 3—3 shown in FIG. 1.

In the drawing in FIG. 1 the mixer or blender of the present invention is shown including a base assembly 100 and a container assembly 200. The base assembly 100 includes a base plate 102 not shown from which four rubber pads 101 extend to support the mixer. The only portion of the base plate 102 shown in FIG. 1 is a rear portion of an air exhaust deflector 103 which extends below a hollow body portion 104 of base assembly 100.

A three position electric switch 105 is then mounted on the hollow body portion 104 to control a motor 106 having a conventional rotor and stator best shown in FIGS. 3 and 5 of the drawings. The switch 105 is employed to turn the motor off and to operate it at two different speeds. Switch 105 is provided with a knob 107 and a name plate 108 shown in FIG. 1.

Figure 6:
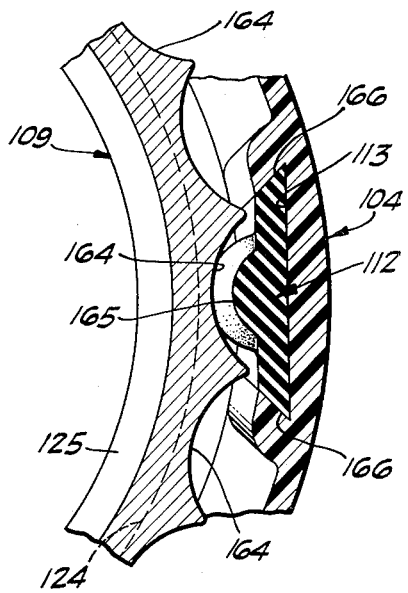
FIG. 6 is an enlarged broken away sectional view of a container assembly support means taken on the line 6—6 shown in FIG. 3.

Container assembly 200 includes a screw cap 109 threaded to the lower end of a large mouthed Mason jar 110, screw cap 109 being provided with outward radially extending lip 111 to rest on four rubber inserts 112 fixed in dove tail slots 113 in the upper end of hollow body portion 104 as best shown in FIG. 6.

In FIG. 1, it can be seen that a blade assembly 113 is provided interiorly of Mason jar 110, assembly 113 including two pairs of blades 114 and 115 extending radially in respective opposite directions from a retaining nut 116 threaded to the upper end of the first or blade drive shaft 117 best shown in FIG. 3.

A plan view of the blade pairs 114 and 115 is shown in FIG. 11. The pair of blades 114 extend upwardly at an angle with respect to a plane transverse to the axis of shaft 117 equal to the angle at which the pair of blades 115 extend below this plane. For this reason, the blades 114 and 115 are economical to manufacture. As seen in FIG. 11, all the blades 114 and 115 are swept back. They are also honed on their undersides as indicated at 118 in FIG. 3. In FIG. 3, it can also be seen that each of the pair of blades 114 and 115 are made of a single piece of formed metal.

As can be seen from both FIGS. 3 and 11, blades 114 are mounted on top of blades 115 and blades 115 are mounted upon a resilient annular body 119 which is in turn mounted upon a washer 120 that rests upon the upper end of a cylindrical body portion 121 of an insert 122 for the lower end or neck of the Mason jar 110.

As shown in FIG. 3, the lower end of Mason jar 110 is threaded exteriorly at 123 and screw cap 109 is threaded at 124 to fit the thread 123 of the Mason jar 110. Screw cap 109 is also provided with an inwardly extending flange 125 to fit against an outward radially extending projection 126 on insert 122. This permits mounting insert 122 is a fixed position against the lower end of Mason jar 110.

As this point, it may be pertinent to note that it is convenient to use Mason jars and the like to keep mixed food under refrigeration or away from air. Other material receptacles besides a Mason jar 110 may be used and, in fact, are preferably used as will be explained in connection with the preferred material receptacle shown in FIGS. 12, 13 and 14 as will be described hereinafter.

In order to prevent damage either to screw cap 109, insert 122 of a Mason jar 110, preferably projection 126 is covered with a resilient material at 127, such as rubber, as is cylindrical body portion 121 of insert 122 at 128. Rubber 128 is also provided with two lips 129 which extend radially from portion 128 at two longitudinally or axially spaced positions on insert 122. This permits accurate alignment of Mason jar 110 with blade shaft 117 and results in more efficient mixing and comminution of materials placed in the Mason jar 110.

As can be seen in FIG. 2, three air intake openings, 130, 131 and 132 at the lower end of base assembly 100 are provided by base plate 102 being spaced at its edges from the wall of hollow body portion 104 of base assembly 100. Air enters as indicated by arrow 133, in FIG. 3, into the space between the hollow body portion 104 which is spaced from the exterior of motor 106. As can be seen in FIG. 2, motor 106 is provided with exhaust apertures 134 for circulating air downwardly through it as indicated by dotted arrows 137. Hence, air is drawn in through apertures 130, 131 and 132 and enters motor 106 at upper apertures 138 best shown in FIG. 3, air being drawn through apertures 138 as indicated by arrow 139. Air is then exhausted through apertures 134 as indicated by arrows 136 by means of an internal exhaust fan arrangement 351.

It is to be noted that deflector 103 causes air to move in a direction of arrows 136 and therefore away from all three of the air intake openings 130, 131 and 132. Furthermore, base plate 102 is provided with an exhaust opening 140 to permit the flow of air in a direction of arrows 136 outwardly of it and underneath it.

A rubber seal or lower shock mounting 141 rests against a downwardly concave portion 142 of base plate 102 to prevent air emanating from exhaust apertures 134 and the motor 106 from traveling in any direction except a direction outwardly of exhaust opening 140 and base plate 102. In addition, at the top of the motor 106 an upper shock mount 143 is provided to prevent air from escaping outwardly of a hole 144 in a web 145 formed integrally of hollow body portion 104 which may be made of a plastic material. This means that a positive flow of air is controlled by motor 106 which is provided with means internally of it to circulate air through apertures 138 downwardly through the motor itself and outwardly of apertures 134. It is to be noted that both structures 141 and 143 are preferably made of a resilient material such as neoprene and therefore absorb substantial vibration induced in the base assembly 100 by motor 106.

Upper shock mount 143 performs three other functions and lower shock mount 141 performs two other functions, all five functions of which will be explained in detail hereinafter.

From the following brief non-rigorous proof, it will be quickly understood why it is desirable to have intake openings 130, 131 and 132 at the lower end of base assembly 100 and to have motor 106 so constructed and arranged as to circulate air downwardly through it. The advantage of the exhaust deflector 103 is obvious in that more efficient cooling is effected by preventing re-circulation of the same air.

If $Q_1$ is the total rate of heat transfer, for example, in calories per second from motor 106 to air passing around it upwardly in a direction of arrows 133 and 139 and downwardly through it in a direction of arrows 137 and 136, the total rate of heat transfer may be given by the following expression:

$$Q_1 = K[(T_M - T_L)A_S + (T_M - T_S)A_L]$$

where K is a constant of proportionality, $T_M$ is the motor temperature, $T_L$ is an "intermediate" temperature at which air enters motor 106 at apertures 138 when it is circulated downwardly through motor 106 or where it leaves it when air is circulated in a direction opposite arrows 133, 139, 137 and 136, $T_L$ being a temperature general to either case, and $A_S$ being the effective cooling area inside the motor 106 and $A_L$ being the effective cooling area outside the motor. $T_S$ is therefore the lowest temperature of air or the temperature at which air enters the system in the general case. In the case set up for $Q_1$, air is circulated in the direction of arrows 133, 139, 137 and 136. For air circulated in the opposite direction the cooling rate, $Q_2$, would be as follows:

$$Q_2 = K[(T_M - T_L)A_L + (T_M - T_S)A_S]$$

It is therefore to prove that the condition for $Q_1 > Q_2$ is a truism if the arrangement shown in FIG. 3 is definitely preferred. Thus, $$K[(T_M - T_L)A_S + (T_M - T_S)A_L]$$
$$> K[(T_M - T_L)A_L + (T_M - T_S)A_S]$$
$$(T_M - T_S)(A_L - A_S) > (T_M - T_L)(A_L - A_S)$$
$$T_M - T_S > T_M - T_L$$
$$T_L > T_S$$

However, by definition $T_L > T_S$ because $T_S$ is the lowest temperature of air or the temperature of air entering the system and a truism is reached. Hence, the arrangement shown in FIG. 3 is always preferred.

As can be seen further in both FIGS. 2 and 3, a downwardly extending indentation 146 is made in base plate 102 to prevent any possible interference with a switch housing 147 mounted through the wall of hollow body portion 104 by means of a threaded shaft 148 having a lock nut 149 thereon to hold switch housing 147 against the inner surface of hollow body portion 104, nut 149 thereby bearing against the plate 108. Wires 150 are then connected from housing 147 to motor 106 through an insulator spacer 151 shown in FIG. 3. Power is supplied to switch 105 through a pair of input power means 152 in a cable 153 as indicated in FIG. 2. Cable 153 enters base plate 102 through an aperture which is preferably provided with a rubber insulator and spacer 154.

Pads 101 and base plate 102 are fixed to hollow body portion 104 by means of screws 155 as indicated in both FIGS. 2 and 4, a washer 156 being provided on screw 155 to hold pads 101 against base plate 102 which is in turn maintained in a fixed position relative to hollow body portion 104. Screw 155 is threaded into a brass insert 162 in a bottom skirt portion 157 of hollow body portion 104.

As stated previously, lower shock mount 141 has another function besides its shock supporting and fluid tight sealing functions. This is shown in FIG. 5 where base plate 102 is shown to be provided with two apertures 160 through which cylindrical projections 158 forming an integral part of shock mount 141 extend. Cylindrical projections 158 fill the apertures 160 in base plate 102 and extend around motor mounting rods 159 which are maintained in fixed positions relative to the motor 106 by means of nuts 161 and washers 163. Use of cylindrical projections 158 on shock mount 141 with mounting rods 159 serve to locate the lower end of motor 106 in a fixed transverse position relative to base plate 102 and still keep it isolated from base plate 102 in relation to vibration.

Figure 7:
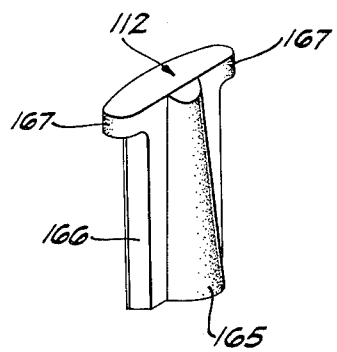
FIG. 7 is a perspective view of a resilient insert to be incorporated and shown in the sectional view of FIG. 6.

In FIG. 6, it can be seen how a vertical linear projection 165 is provided on a rubber insert 112 to fit into concavities 164 in screw cap 109. Insert 112 has a configuration to fit in dove tail slot 113 at the upper end of hollow body portion 104. This angular shape of insert 112 shown in FIGS. 6 and 7 is indicated at 166. Best seen in FIG. 7 is a pair of circumferentially extending portions 167 of insert 112 to rest between the upper end of hollow body portion 104 and radially extending lip 111 of screw cap 109 to support container assembly 200 in a shock absorbing manner.

As best shown in FIG. 3, upper shock mount 143 comprises an inner cylinder 168 which is connected integrally with an outer cylinder 169 by means of a web 170 to form a recess 171 to permit rubber "growth" as mounting 143 absorbs oil and the like.

Another feature of the invention resides in the use of inwardly extending upper end 172 of shock mount 143 to fit the outside diameter of blade shaft 117 snugly to prevent materials accidentally deposited thereon from entering motor 106. Material falling on this portion of the base assembly 100 also may be entrained at 173 in web 145. It is for this reason that web 145 extends upwardly at the center of the base hollow body portion 104.

Figure 8:
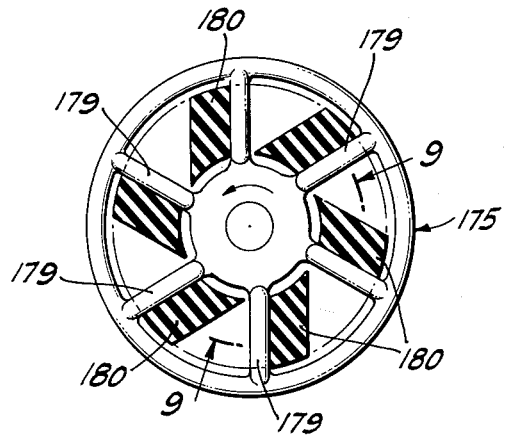
FIG. 8 is a transverse sectional view of a driving connection for a pair of vertically aligned shafts taken on the line 8—8 shown in FIG. 3.

Motor 106 is provided with a drive shaft 178 and a drive coupling arrangement 174 is provided for mutually adjacent ends of aligned blade shaft 117 and motor drive shaft 178. Drive coupling 174 includes a first drive coupling 176 threaded to the lower end of blade drive shaft 117 and a wheel arrangement 175 fixed to the upper end of motor drive shaft 178 by means of a set screw 177. Drive coupling arrangement 174 may be better understood with reference to FIGS. 8, 9 and 10 of the drawings. As shown in FIG. 8, lower second drive coupling 175 is die-cast and is preferably made of aluminium and has polished rounded spokes 179 whereby first drive coupling 176 may be removed from it while motor 106 is running, mechanical force being transmitted to upper or first drive coupling 176 via downwardly extending projections 180, preferably made of rubber, spaces between which spokes 179 of second drive coupling 175 occupy.

Figure 10:
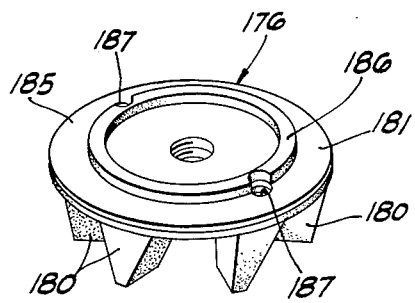
FIG. 10 is a perspective view of a first or upper drive coupling shown in FIG. 3.
Figure 9:
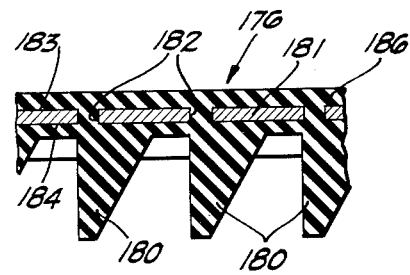
FIG. 9 is an enlarged broken sectional view of the driving connection taken on the line 9—9 shown in FIG. 8.

Preferably the mechanical structure of first drive coupling 176 is of a special sort to make it resilient but generally strong and rigid. For this reason, a rigid plate 181 having apertures 182 therein are provided and a thermo-plastic material or rubber composition of which projections 180 are made extends through apertures 182 and therefore over both upper and lower surfaces 183 and 184 of plate or disc-shaped member 181 as indicated in FIG. 9. After material is distributed in this manner it is cured or the rubber is set. This forms a strong mechanical as well as a chemical bond between the projections 180 and disc-shaped member 181. Additional rubber material is provided on surface 183 of disc-shaped member 181 and at a ring 186 extending vertically above apertures 182, the section 99 being a circumferential section. As indicated in FIG. 10, two apertures 187 may be, but are not necessarily provided to permit the insertion of a spanner type wrench to tighten drive coupling 176 on blade drive shaft 114 as it is threaded thereto, this being indicated both in FIGS. 3 and 10.

As stated previously, a receptacle 300 shown in FIGS. 12, 13 and 14 is a material receptacle preferred over any simple form such as the Mason jar 110 shown in the other figures of the drawings. As indicated in FIG. 13, receptacle 300 may be threaded at 301 to have the same threads as the thread 123 at the lower end of Mason jar 110 and therefore fit comfortably over insert 122, blade assembly 113 and screw cap 109 being exactly the same as those shown in FIG. 3 of the drawings.

Material receptable 300 may be made of any material desired. Preferably it is provided with a cap 302 at its upper end having a removable center portion 303 to permit air to enter the receptacle 300 without permitting materials to be distributed out of it.

The receptacle 300 is provided with four inwardly extending fluted portions 304 best shown in FIG. 14. The fluted portions 304 substantially increase the comminution efficiency of the blade assembly 113.

From the foregoing, it can be seen that the invention has a large number of desirable features. It can be seen that the manner of exhausting air through the aperture 140 in base plate 102 prevents re-circulation of hot air. Further, the effective method of passing the coolest air over the largest area, i.e. the external surface of the motor before it is passed downwardly through it permits most efficient cooling as proved earlier. This means that a smaller motor may be employed thereby permitting a reduction in weight of the blender unit and permitting more economical manufacture and maintenance, all of this being a result of the more efficient cooling system of the mixer motor.

It is to be noted further that the upper and lower motor shock mounts 143 and 141 perform several functions. Firstly, the upper shock mount 143 has a shock absorbing function. Secondly, it is provided with configuration to permit rubber "growth." Thirdly, it is provided with means to seal to the upper end of motor drive shaft 178. Lastly, the upper shock mount 143 seals to motor drive shaft 178 and web 145 of hollow body portion 104.

Lower shock mount 141 provides a fluid tight seal between motor 106 and base plate 102 to permit motor exhaust to be blown outwardly of aperture 140. Lower shock mount 141 absorbs vibration from motor 106 and, in addition, maintains it in a secure transverse position by projections 158 on rods 159.

Lips 129 on the resilient material covering receptacle insert 122 at 127 and 128 permit efficient comminution of materials placed in material receptacle 110 by uniformly aligning receptacle 110 on insert 122. This is produced by neck portion of receptacle 110 being at the two spaced axial positions of lips 129.

Container assembly resilient support means or inserts 112 also have two functions. In the first place, they reduce vibration and reduce the instability of the unit as a whole. Furthermore, they safely support container assembly 200 above base assembly 100. In addition, the snug fit of projections 165 in concavities 164 of screw cap 109 prevent container assembly 200 from turning on base assembly 100 due both to vibration and torque of motor 106.

According to another feature of the invention, the particular arrangement of the polished and rounded spokes 179 of wheel 175 permits removal of container assembly 200 from base assembly 100 while motor 106 is running. That is, container assembly 200 in this case may be both easily and safely removed while motor 106 is running.

According to another feature of the invention, inwardly extending fluted portions 304 of material receptacle 300 permit more efficient comminution of materials placed therein.

It is noted that the receptacle 300 shown in FIG. 14 has a special construction including four smooth major wall portions between the fluted portions or flanges 304, and that each of the flanges 304 have two sides at right angles to each other. The flanges also have corners which extend inwardly toward the vertical axis of the container 300. The vertical edges of the sides of the flanges 304 are obviously connected or integral with the major wall portions between flanges, one side of each of a first pair of flanges being disposed substantially in a first predetermined plane with one side of each of the other pair of flanges 304 being disposed substantially in a second predetermined plane parallel to the first predetermined plane. The other side of the first pair of flanges are disposed substantially in a third predetermined plane perpendicular to the first and second planes, and the other side of each of the second pair of flanges is disposed substantially in a fourth predetermined plane parallel to the third predetermined plane.

According to an aspect of the invention, blades 114 and 115 of assembly 113 are easy and economical to manufacture because they are bent to the same angles. Furthermore, the fact that they are swept back and honed from the bottom make them both economical to manufacture and very efficient in cutting in their comminution function.

According to another feature of the invention, the fact that web 145 of base assembly hollow body portion 104 is tilted upwardly toward the center permits entraining of materials and thereby prevents them from entering motor 106 via motor drive shafts 178.

According to a still further feature of the invention, the method and article of the first drive coupling 175 in being bonded to disc-shaped member 181 and extending through apertures 182 therein makes the resilient material of which first drive coupling 175 is formed mechanically secure to disc-shaped member 181.

It is to be noted further that lip 111 on screw cap 109 permits easy and convenient assembly of the blender of the invention.

Although the fact that a plane tangent to the surface of deflector 103 never is horizontal may not seem important, it is in fact very important that a plane tangent to its surface at any point always be at an angle with respect to the horizontal, even at its lower end 350. Motor operating temperature may be reduced by as much as 15 degrees centigrade, e.g., from 85 degrees to 70 degrees centigrade.

Although only one specific embodiment of the invention has been shown and described, it is to be understood that the invention is by no means limited to this embodiment since it is shown merely for purposes of illustration and that the true scope of the invention is not defined thereby but defined only in the appended claims.

What is claimed is:

1. A blender comprising separable container and base assemblies; said container assembly comprising a material receptacle having upper and lower ends, an outside thread on the lower end of said receptacle, an insert to fit inside the lower end of said receptacle, said insert having a blade drive shaft mounted in a fixed axial but rotatable angular position through it, said blade drive shaft having upper and lower ends, a bladed member fixed to the upper end of said blade drive shaft, a first drive coupling fixed to the lower end of said blade drive shaft, said insert also including a cylindrical body portion to fit inside the lower end of and having a radial projection to fit against the lower end of said material receptacle, a resilient material to fit around the cylindrical portion of said insert and on an upper side of said radial insert projection between said insert and said receptacle, and an annular screw cap having a female thread to be threaded over the lower end of said receptacle and having a flange to hold said insert in place in said receptacle, said screw cap having a radially projecting lip; said base assembly comprising a hollow body portion, first resilient means at the top of said hollow body portion to support said container assembly at the projecting lip of said screw cap, a base plate to cover the lower end of said hollow body portion, said hollow body portion having a web, a motor having a drive shaft extending upwardly through a hole in said web, second resilient means between the upper end of said motor and said web, third resilient means between the lower end of said motor and said base plate, and a second drive coupling fixed to the upper end of said motor drive shaft for engagement with said first drive coupling to rotate said bladed member.

2. The invention as defined in claim 1, wherein a portion of said resilient material covering the cylindrical body portion of said insert is provided with at least two axially spaced and radially extending resilient lips to contact said material receptacle at two axial positions inside its lower end to center said receptacle on the radial projection of said insert.

3. The invention as defined in claim 1, wherein said screw cap is provided with vertical concavities around its circumference, wherein the upper end of said hollow body portion of said base assembly is provided with at least three axially extending interior dove tail slots, and wherein said first resilient means includes the following: at least three resilient inserts to fit in the dove tail slots of said hollow body portion, each of said inserts having longitudinal inwardly extending projections to fit in said concavities of said screw cap to hold it in a substantially fixed circumferential position against torque of said motor, said resilient inserts also being provided with ends to extend over the upper end of said hollow body portion to support said container assembly at the lip of said screw cap in a position spaced from the upper end of said hollow body portion.

4. The invention as defined in claim 1, wherein said first drive coupling includes a rigid disc-shaped body with circumferentially spaced resilient projections bonded thereto, said disc-shaped body having holes at the positions of said projections on said disc-shaped body, the material of said projections covering a surface of said disc-shaped body around said holes on the side of said disc-shaped body that said projections are bonded, the material of said projections extending from said projections through said apertures and over an opposite surface on said rigid body around said apertures to provide a strong mechanical connection between said projections and said rigid body, and wherein said second drive coupling includes means to engage said projections.

5. The invention as defined in claim 1, wherein said first drive coupling includes a plurality of resilient projections, and wherein said second drive coupling includes a wheel having polished spokes having rounded ends to fit in spaces between said resilient projections.

6. The invention as defined in claim 1, wherein said second resilient means includes an inner rubber cylinder to fit around said motor drive shaft and an outer rubber cylinder having an inwardly extending web portion fixed to said inner cylinder forming an annular recess with it to accommodate rubber growth, the upper end of said inner cylinder having a diameter to fit tightly around said motor drive shaft to prevent entry of materials into said motor via said motor drive shaft, said web of said hollow body portion conforming to the shape of the topmost portions of said inner and outer cylinders to hold the upper end of said motor drive shaft in a fixed radial position, but being spaced from said outer cylinder web portion to define said annular recess therewith.

7. The invention as defined in claim 6, wherein said base plate is apertured, wherein said motor is provided with vertically extending mounting rods, and wherein said third resilient means is provided with a base portion to support said motor and hollow rubber extensions both to fit around said motor mounting rods and to fit in the apertures in said base plate.

8. The invention as defined in claim 7, wherein said third resilient means includes a rubber ring having said hollow rubber extensions, wherein said hollow body portion is spaced from said motor, wherein said motor is provided with means to circulate air downwardly through it, wherein an intake opening is provided from the exterior of said base assembly into the space between said motor and said hollow body portion, said second resilient means forming a fluid tight seal around said motor drive shaft and with the web of said hollow body portion, said third resilient means forming a fluid tight seal with said base plate, an exhaust aperture in said base plate included in the inner diameter of the annular shape of said rubber ring, means to support said base plate, and means to deflect air exhausted through said exhaust apertures under said base plate in a radial direction opposite said intake opening both to permit efficient cooling of said motor internally and externally thereof, and to prevent re-circulation of the same cooling air therearound.

9. The invention as defined in claim 1, wherein said base plate is apertured, wherein said motor is provided with vertically extending mounting rods, and wherein said third resilient means is provided with a base portion to support said motor and hollow rubber extensions both to fit around said motor mounting rods and to fit in the apertures in said base plate to maintain said motor in a fixed transverse position relative to said base plate.

10. The invention as defined in claim 1, wherein said hollow body portion of said base assembly is spaced from said motor, wherein an intake aperture is positioned at the bottom of said base assembly to provide free and open communication from the exterior of said base assembly into the space between said hollow body portion and said motor only on one side thereof, said motor having means to circulate air downwardly through itself, air thereby being drawn into the space between said hollow body portion and said motor through said intake opening to permit cooling of said motor by a flow of air both exteriorly and interiorly of it, and an exhaust aperture in said base plate below said motor, means to support said base plate, and means to deflect air exhausted through said exhaust aperture under said base plate in a radial direction opposite the position of said intake aperture to prevent re-circulation of the same cooling air.

11. The invention as defined in claim 1, wherein said material receptacle is provided with inwardly extending fluted portions spaced ninety mechanical degrees apart to facilitate comminution of materials placed therein.

12. The invention as defined in claim 1, wherein two oppositely extending pairs of blades are fixed to the upper end of said blade drive shaft, one pair of said blades extending downwardly and the other pair of said blades extending upwardly at the same angle with respect to a transverse plane, all of said blades being swept back and being honed from their lower sides.

13. The invention as defined in claim 1, wherein the web of said hollow body portion extends from the interior thereof upwardly at the center to entrain any materials accidentally dripping from said material receptacle in a circumferential trough spaced radially from said motor drive shaft.

14. In a mixer having a supporting base assembly, said base assembly including a motor having a vertical drive shaft, an upper shock mounting for said motor, said shock mounting comprising: an inner rubber cylinder to fit around said motor drive shaft, and an outer rubber cylinder having an inwardly extending web portion fixed to said inner cylinder forming an annular recess with said inner cylinder to allow room for rubber "growth."

15. The invention as defined in claim 14, wherein the inner diameter of said inner cylinder at its top is smaller than the diameter of the said drive shaft to provide a fluid tight seal at the top thereof to prevent seepage of material accidentally distributed over the top of said inner cylinder from entering said motor via said drive shaft.

16. In a mixer having a supporting base assembly containing a motor with a vertically positioned drive shaft, a shock absorbing mounting arrangement for said motor, said arrangement comprising: a hollow body portion spaced from and surrounding said motor, said hollow body portion having a web near its upper end and a base plate to cover its lower end, and first resilient means to fit between said web and the top of said motor, and second resilient means to fit between the bottom of said motor and said base plate to prevent vibration of said motor from being transmitted to said hollow body portion, said motor being spaced from said hollow body portion and being provided with means to circulate air downwardly through it, said web being spaced from the upper end of said motor, an opening at the lower end of said base assembly into the space between said motor and said hollow body portion whereby air may flow into said space upwardly to said web of said hollow body portion and downwardly through said motor, said motor being open at its lower end, said base plate being provided with an exhaust aperture at said lower motor opening, said first resilient means providing a fluid tight seal between said motor drive shaft and said web of said hollow body portion, said second resilient means providing a fluid tight seal between the lower end of said motor and said base plate around said exhaust aperture in said base plate, the lower open end of said motor thereby being in open communication only with said base plate exhaust aperture, said first and second resilient means thereby performing dual functions.

17. The invention as defined in claim 16, wherein means are provided to deflect air emanating from said exhaust aperture in a direction opposite said intake opening to prevent re-circulation of the same air.

18. In a mixer having a motor having a vertically positioned drive shaft and having means to circulate air downwardly through itself, a base assembly to support said container assembly and to direct air firstly over the exterior of and secondly through the interior of the motor in that order, said base assembly comprising: a hollow body portion surrounding and spaced from the motor and having a web, the shaft of the motor extending upwardly through the web, a base plate located below the motor and covering a bottom opening of said hollow body, at least one intake opening at the bottom of said body portion providing free and open communication from the exterior thereof into the space between said hollow body portion and the exterior of the motor to cause air to be circulated over the exterior of the motor upwardly to the web then downwardly through the motor, and an exhaust opening through said base plate at the lower end of the motor, said motor having an opening at its lower end to provide free and open communication for air circulated downwardly through it to a point exteriorly of said base plate through said exhaust opening.

19. The invention as defined in claim 18, wherein means are provided to deflect air emanating from said exhaust aperture in a radial direction opposite the direction of said intake opening from said exhaust aperture to prevent re-circulation of the same air.

20. A mixer comprising separate container and base assembly, said container assembly being adapted to rest on said base assembly, said container assembly comprising a material receptacle having upper and lower ends, an outside thread on the lower end of said receptacle, an insert to fit inside the lower end of said receptacle, said insert having a blade drive shaft mounted in a fixed axial but rotatable angular position through it, said blade drive shaft having upper and lower ends, a bladed member fixed to the upper end of said blade drive shaft, a first drive coupling fixed to the lower end of said blade drive shaft, said insert also including a cylindrical body portion to fit inside the lower end of and having a radial projection to fit against the lower end of said material receptacle, a resilient material to fit around the cylindrical portion of said insert and on an upper side of said radial insert projection between said insert and said receptacle, and an annular screw cap having a female thread to be threaded over the lower end of said receptacle and having a flange to hold said insert in place against the lower end of said receptacle; said base assembly including a motor having a vertically positioned drive shaft with a second drive coupling on its upper end for connection with said first drive coupling; a portion of said resilient material covering the cylindrical body portion of said insert being provided with at least two axially spaced and radially extending resilient lips to contact said material receptacle at two axial positions inside its lower end to center said receptacle on the radial projection of said insert.

21. In a mixer having a motor having a vertically positioned drive shaft and having means to circulate air downwardly through itself, a base assembly to support said container assembly and to direct air firstly over the exterior of and secondly through the interior of the motor in that order, said base assembly comprising: a hollow body portion surrounding and spaced from the motor and having a web, the shaft of the motor extending upwardly through the web, a base plate below the motor covering a bottom opening of said hollow body, at least one intake opening at the bottom of said body portion providing free and open communication from the exterior thereof into the space between said hollow body portion and the exterior of the motor to cause air to be circulated over the exterior of the motor upwardly to the web then downwardly through the motor, and an exhaust opening through said base plate at the lower end of the motor, said motor having an opening at its lower end to provide free and open communication for air circulated downwardly through it to a point exteriorly of said base plate through said exhaust opening, a scoop-shaped deflector for directing air emanating from said exhaust aperture radially downwardly therefrom in a direction opposite the direction of said intake opening from said exhaust aperture to prevent recirculation of the same air, the shape of said deflector being such that a plane tangent to it always lies at an angle larger than zero with respect to a plane transverse to the motor drive shaft.

22. A cooling system for a mixer, said system comprising: a base housing providing a substantially complete enclosure, but having at least one hole therethrough both at the center and at the periphery of the bottom thereof; a motor having a stator and a rotor rotatable therein, said stator being mounted in spaced relation to said housing with said rotor extending substantially vertically therein; blower means to circulate air continuously both through and around said stator; and deflector means on the bottom of said base adjacent one of said holes and facing in a direction different from the direction of the other of said holes from said one hole to prevent recirculation of the same air.

23. A cooling system for a mixer, said system comprising: an approximately cylindrical base housing providing a substantially complete enclosure, but having at least one hole therethrough both at the center and at the periphery of the bottom thereof; a motor having a stator and a rotor rotatable therein, said stator being mounted in spaced relation to said housing with rotor extending substantially vertically therein; blower means to circulate air continuously both through and around said stator; and deflector means on the bottom of said base adjacent the center hole and facing in a direction different from the direction of the peripheral hole from said center hole to prevent recirculation of the same air.

24. A cooling system for a mixer, said system comprising: an inverted receptacle shaped base housing; a base plate to cover the lower end of said housing, said base plate being spaced from said housing around only a portion of the edge thereof, said base plate also having at least one hole through the center thereof; a motor having a stator and a rotor rotatable therein, said stator being mounted in spaced relation to said housing with said rotor extending substantially vertically therein; blower means to circulate air continuously both through and around said stator; and deflector means fixed to said plate adjacent the center hole therethrough in a position facing in a direction different from the direction of the portion of said plate spaced from said housing from said center hole to prevent recirculation of the same air.

25. An insert closure for a lower end of a mixer receptacle having both ends open and a male thread on the outside of its lower end, said insert closure comprising: a cylindrical body to fit inside the lower end of and having a radial projection to fit against the lower end of said receptacle; a resilient material to fit around the side of said body and to fit between said projection and said receptacle on the upper side of said projection; and an annular screw cap having a female thread to be threaded over the lower end of said receptacle and having a flange to hold said projection in place against the lower end of said receptacle, a portion of said resilient material covering the side of said body being provided with at least two axially spaced and radially extending resilient lips to contact the internal surface of said receptacle at the lower end thereof at two axially spaced positions.

26. A drive shaft coupling manually separable while being driven at high speeds without damage thereto and without injury to the person, said coupling comprising: first and second shafts approximately aligned in end-to-end relation and mounted to rotate about a predetermined axis; a plurality of resilient projections mounted in a position extending longitudinally approximately in the same direction as, but in spaced relation to said predetermined axis as well as in spaced relation to each other; means fixed to said first shaft holding only one end of each of said projections rigidly in position relative thereto, whereby said first shaft will rotate upon rotation of said projections; and a wheel having a rigid hub fixed rigidly to said second shaft, and a plurality of smooth, rigid spokes fixed rigidly to said hub at their inner ends, said spokes being fixed to said hub in a position to extend approximately radially therefrom between said resilient projections for rotation therewith approximately in a plane perpendicular to said predetermined axis, each adjacent pair of said spokes being spaced apart a distance sufficient to receive one of said projections therebetween, said projections extending longitudinally into corresponding spaces between adjacent pairs of spokes in interfitting relationship.

27. A drive shaft coupling manually separable while being driven at high speeds without damage thereto and without injury to the person, said coupling comprising: first and second shafts approximately aligned in end-to-end relation and mounted to rotate about a predetermined axis; a plurality of resilient projections mounted in a position extending longitudinally approximately in the same direction as, but in spaced relation to each other; means fixed to said first shaft holding only one end of each of said projections rigidly in position relative thereto, whereby said first shaft will rotate upon rotation of said projections; and a wheel having a rigid hub fixed rigidly to said second shaft, and a plurality of smooth, rigid spokes fixed rigidly to said hub at their inner ends, said spokes being fixed to said hub in a position to extend approximately radially therefrom between said resilient projections for rotation therewith approximately in a plane perpendicular to said predetermined axis, each adjacent pair of said spokes being spaced apart a distance sufficient to receive one of said projections therebetween, said projections extending longitudinally into corresponding spaces between adjacent pairs of spokes in interfitting relationship.

28. A drive shaft coupling manually separable while being driven at high speeds without damage thereto and without injury to the person, said coupling comprising: first and second shafts approximately aligned in end-to-end relation and mounted to rotate about a predetermined axis; a plurality of resilient projections mounted in a position extending longitudinally approximately in the same direction as, but in spaced relation to said predetermined axis, as well as in spaced relation to each other; means fixed to said first shaft holding only one end of each of said projections rigidly in position relative thereto, whereby said first shaft will rotate upon rotation of said projections; and a wheel having a rigid hub fixed rigidly to said second shaft, a plurality of smooth, rigid spokes fixed rigidly to said hub at their inner ends, and a rigid rim fixed rigidly to the outer ends of said spokes, said spokes being fixed to said hub in a position to extend approximately radially therefrom between said resilient projections for rotation therewith approximately in a plan perpendicular to said predetermined axis, each adjacent pair of said spokes being spaced apart a distance sufficient to receive one of said projections therebetween, said projections extending longitudinally into corresponding spaces between adjacent pairs of spokes in interfitting relationship.

29. A mixer comprising: a container assembly having a rotatable blade shaft extending vertically downward therefrom at the lower end thereof; a base to support said container assembly in a substantially fixed rotational position about the axis of said blade shaft, but in a horizontally movable position; a motor mounted on said base; a drive shaft mounted on said base in a position to be rotated about an approximately vertical axis by said motor, said container assembly resting on said base in a position such that said shafts are approximately aligned in end-to-end relation; a plurality of resilient projections mounted in a position extending vertically and approximately in the same direction as, but in spaced relation to each other; means fixed to one of said shafts holding only one end of each of said projections rigidly in position relative thereto, whereby said one shaft will rotate upon rotation of said projections; and a wheel having a rigid hub fixed rigidly to the other of said shafts, and a plurality of smooth, rigid spokes fixed rigidly to said hub at their inner ends, said spokes being fixed to said hub in a position to extend approximately radially therefrom between said resilient projections for rotation therewith approximately in a plane perpendicular to said predetermined axis, each adjacent pair of said spokes being spaced apart a distance sufficient to receive one of said projections therebetween, said projections extending longitudinally into corresponding spaces between adjacent pairs of spokes in interfitting relationship.

30. A drive shaft coupling comprising: a rigid-disc-shaped member having a plurality of holes through it around its circumference, said holes being spaced inwardly of the outer edge of said disc-shaped member, said disc-shaped member being adapted to be given about a predetermined axis approximately perpendicular to it and spaced from said holes; and a thermosetting elastomeric body extending from one surface of said disc-shaped member surrounding said holes on said one surface, extending through said holes, and surrounding said holes on the other surface of said disc-shaped member, portions of said elastomeric body lying on both of said surfaces of said disc-shaped member and portions of said elastomeric body extending through said holes being integrally connected parts of said elastomeric body and thereby being continuous on both of said surfaces of said disc-shaped member through said holes therein, said body including a projection for each of said holes, each of said projections having a base portion larger than and located in a position covering each corresponding hole, only the base portions of said projections being fixed relative to said disc-shaped member, said projections extending longitudinally from said other surface of said disc-shaped member in approximately the same direction as, but in spaced relation to said predetermined axis as well as in spaced relation to each other.

References Cited in the file of this patent

UNITED STATES PATENTS

| | | |
|---|---|---|
| 1,141,358 | Portman | June 1, 1915 |
| 1,344,425 | Midgett | June 22, 1920 |
| 1,403,143 | Atwood et al. | Jan. 10, 1922 |
| 1,480,914 | Poplawski | July 15, 1924 |
| 1,521,359 | Costa | Dec. 30, 1924 |
| 1,928,965 | Dormeyer | Oct. 3, 1933 |
| 2,025,829 | Ricefield | Dec. 31, 1935 |
| 2,079,460 | Marty | May 4, 1937 |
| 2,126,465 | Hilgenberg | Aug. 9, 1938 |
| 2,169,869 | Blunt | Aug. 15, 1939 |
| 2,278,125 | Landgraf | Mar. 31, 1942 |
| 2,284,155 | Landgraf | May 26, 1942 |
| 2,304,476 | Poplawski | Dec. 8, 1942 |
| 2,381,186 | Roquemore | Aug. 7, 1945 |
| 2,429,284 | Wildhaber | Oct. 21, 1947 |
| 2,530,455 | Fross | Nov. 21, 1950 |
| 2,585,255 | Kockner et al. | Feb. 12, 1952 |
| 2,615,942 | Edman | Oct. 28, 1952 |
| 2,679,468 | Pitman | May 25, 1954 |
| 2,716,334 | Scott et al. | Aug. 30, 1955 |
| 2,755,900 | Seyfried | July 24, 1956 |
| 2,757,909 | Wayne | Aug. 7, 1956 |
| 2,761,659 | Collura | Sept. 4, 1956 |
| 2,771,111 | Seyfried | Nov. 20, 1956 |
| 2,849,871 | Moeller | Sept. 2, 1958 |
| 2,873,599 | Buechler | Feb. 17, 1959 |
| 2,992,715 | Blachly | July 18, 1961 |

UNITED STATES PATENT OFFICE
CERTIFICATE OF CORRECTION

Patent No. 3,064,949 November 20, 1962

Henry A. Dewenter

It is hereby certified that error appears in the above numbered patent requiring correction and that the said Letters Patent should read as corrected below.

Column 2, line 63, for "is" read -- in --; line 65, for "As" read -- At --; column 13, line 22, for "given" read -- driven --.

Signed and sealed this 16th day of July 1963.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,064,949                                      November 20, 1962

Henry A. Dewenter

It is hereby certified that error appears in the above numbered patent requiring correction and that the said Letters Patent should read as corrected below.

Column 2, line 63, for "is" read -- in --; line 65, for "As" read -- At --; column 13, line 22, for "given" read -- driven --.

Signed and sealed this 16th day of July 1963.

(SEAL)
Attest:

ERNEST W. SWIDER                                            DAVID L. LADD
Attesting Officer                                               Commissioner of Patents